No. 774,372. PATENTED NOV. 8, 1904.
D. N. BAXTER.
WATER PURIFIER.
APPLICATION FILED FEB. 11, 1904.
NO MODEL. 2 SHEETS—SHEET 1.
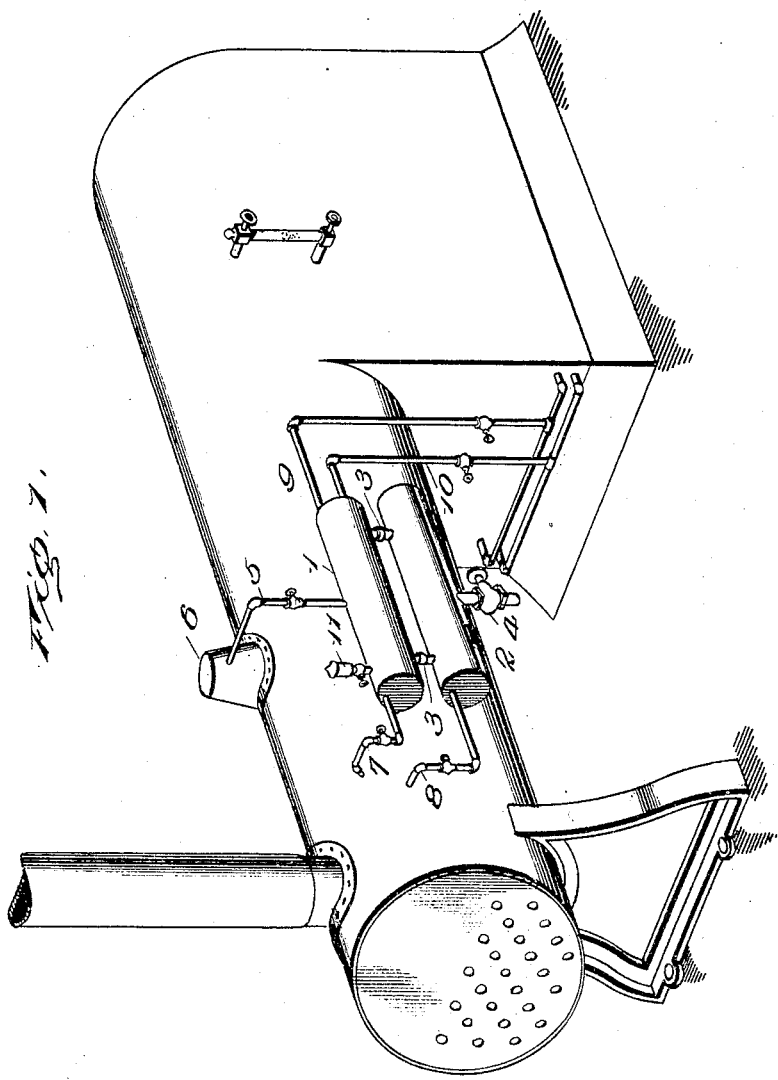
Witnesses
Inventor
Daniel N. Baxter.
By
his
Attorneys

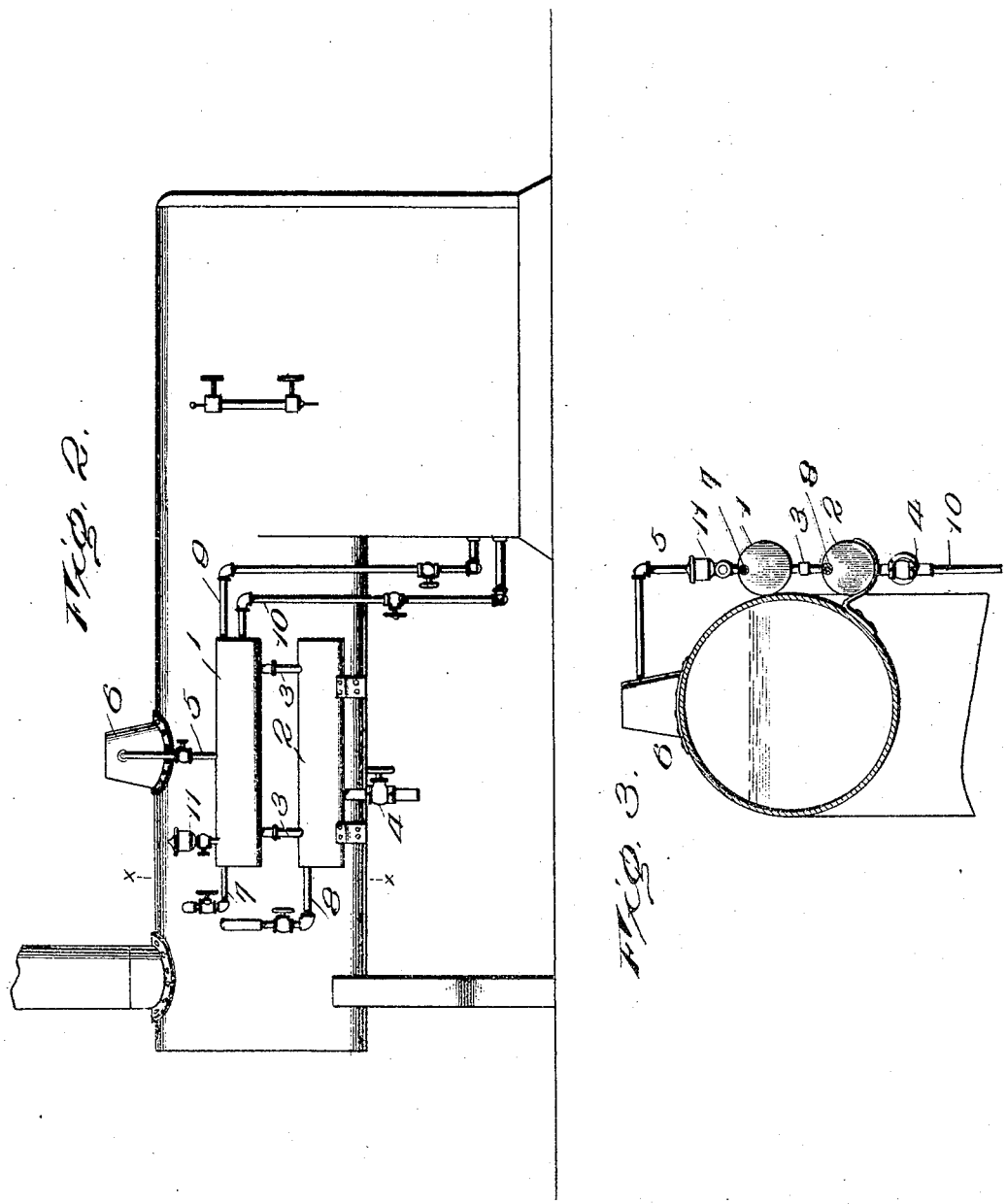

No. 774,372. Patented November 8, 1904.

UNITED STATES PATENT OFFICE.

DANIEL N. BAXTER, OF WICHITA, KANSAS, ASSIGNOR OF ONE-HALF TO W. G. HOUSER, OF WICHITA, KANSAS.

WATER-PURIFIER.

SPECIFICATION forming part of Letters Patent No. 774,372, dated November 8, 1904.

Application filed February 11, 1904. Serial No. 193,171. (No model.)

*To all whom it may concern:*

Be it known that I, DANIEL N. BAXTER, a citizen of the United States, residing at Wichita, in the county of Sedgwick and State of Kansas, have invented certain new and useful Improvements in Water-Purifiers for Boilers, of which the following is a specification.

This invention is designed to provide novel means for coöperation with a steam-boiler or like contrivance for heating liquid either for motive or heating application for purifying the water and removing all foreign matter that would tend to produce scale, incrustation, or cause foaming of the water during the process of ebullition.

In boilers, whether for generating steam or designed solely for heating purposes, the level of the water is not always uniform, and there are extreme points commonly designated as "high water" and "low water," and it is the purpose of this invention to provide a cleaner that will operate successfully when the level of the water corresponds with either one of the extreme positions. For this purpose there are two well-defined circuits for maintaining circulation of the water, independent pipes being devised and complemental drums or sediment-chambers provided. A cup or receptacle forms a part of the purifier and is adapted to receive oil or other means for supplying to the water a medium which will facilitate the precipitation of foreign matter and in a measure reduce the foaming incidental to ebullition.

The invention consists of the novel features, details of construction, and combinations of parts, which hereinafter will be more particularly set forth, illustrated, and finally claimed.

In the drawings hereto attached and forming a part of the specification, Figure 1 is a perspective view of a steam-boiler of the locomotive type having a water-purifier embodying the invention in position. Fig. 2 is a side view of the parts shown in Fig. 1. Fig. 3 is a transverse section on the line X X of Fig. 2 looking to the front, the lower portion of the furnace being broken away.

Corresponding and like parts are referred to in the following description and indicated in all the views of the drawings by the same reference characters.

It is to be understood that it is contemplated to apply the invention to all types, styles, and varieties of boilers, whether for heating water simply or for converting the water into steam. The purifier may be arranged with reference to the boiler as found most convenient and advantageous, according to the style of the boiler and the location. Inasmuch as devices of this character are most generally applied to locomotive-boilers, the purifier is illustrated in this connection in the present drawings. The purifier comprises the drums or sediment-chambers 1 and 2, preferably arranged the one above the other in horizontal position and connected near their ends by short pipes 3. The lower drum or sediment-chamber by reason of its location acts as a collector or accumulator for containing a quantity of precipitant, which is blown off at intervals through the valved pipe 4, applied to the lowest point of the drum. The upper drum or chamber 1 is connected, by means of the valved pipe 5, with the steam-dome 6 of the boiler, and when it is required to clear the drum or chamber 2 of all accumulation the blow-off 4 is opened and the valve of the steam-pipe 5 turned so as to permit unobstructed passage of the steam into the chamber 1, the valves of the remaining pipes being closed. Hence the pressure of the steam will clear the chambers or drums and insure the forcible ejection of all mud and other matter through the blow-off 4.

A valved inflow-pipe 7 connects the upper portion of the drum or chamber 1 with the boiler at a point corresponding to the high-water mark, and a similar valved pipe 8 connects the upper portion of the drum or chamber 2 with the boiler at a point corresponding approximately to the low-water level. The valved pipe 9 connects the upper portion of the drum or chamber 1 with the boiler at or near its lowest point, and a similar valved pipe 10 connects the drum or chamber 1 at a point between its upper and lower portions with the lowest portion of the boiler. The valved pipes 7 and 9 constitute one circuit and correspond to the high-water mark. The pipes 8 and 10 form the second circuit and correspond to the low-water mark or level. When the water is at the high-water mark in the boiler, it passes from said boiler through the pipe 7 into the drum or chamber 1 and through pipe 9 back into the boiler. The water in its passage through the drum or chamber 1 is relieved of mud, mineral, and other foreign matter which usually tends to produce scale and incrustation in the boiler and collects in the drum or chamber 2, passing from the drum 1 through the pipes 3 into said chamber 2. Obviously a small proportion of the water will pass through the valved pipe 8, chamber 2, and valved pipe 10; but the circulation in this direction is comparatively small when the quantity of water passing through the pipes 7 and 9 is considered. When the water in the boiler is low, the circulation is through the low-water circuit, the water passing from the boiler through the valved pipe 8 into the chamber 2, from thence through the pipe 3 into the chamber 1, and from the latter through the valved pipe 10 back into the boiler. In this circulation of the water the latter requires a longer time to pass through the two chambers and the pipe 3. Hence the tendency for precipitation of the foreign matter is materially increased.

A cup or vessel 11 is connected to the upper portion of the chamber or drum 1 and is primarily designed to receive the oil, which being added to the water in minute quantity has a beneficial result in preventing foaming and in effecting separation of the foreign matter. However, instead of oil any agent may be placed in the cup or receptacle which experiment may determine as having a reactionary effect upon the water either to neutralize mineral, carbonaceous, or other foreign matter. The pipe or other connection between the receptacle 11 and the drum 1 is provided with a valve to admit of regulating the supply of the agent to the water either at determinate intervals or continuously a drop at a time.

While it is preferred to arrange both drums on the same side of the boiler, nevertheless it is contemplated within the purview of the invention to dispose the same so that one drum may be upon one side and the other on the opposite side of the boiler, the connections and circuits being substantially the same. When thus arranged, each drum will be provided with a blow-off.

The valved pipes 9 and 10 constitute the outflow or return pipes, and their lower ends are branched and connected to the corners of the boiler, so as to insure an equal circulation of the water at both sides of the boiler.

Having thus described the invention, what is claimed as new is—

1. In a purifier for boilers, separate and independent circuits, the inflow of one circuit corresponding to the high-water mark of the boiler and the inflow of the second circuit corresponding to the low-water mark of the water in said boiler, substantially as set forth.

2. In a water-purifier for boilers, the combination of an upper and a lower drum or chamber in communication, the lower drum being provided with a blow-off and the upper drum having connection with the steam-space of the boiler, valved pipes connecting the upper portion of the upper drum with, respectively, the upper and lower portions of the boiler, the inflow-pipe joining the boiler at a point corresponding to the high-water mark, a valved pipe connecting the upper portion of the lower drum with the boiler at a point corresponding to the low-water mark, and a valved pipe connecting the upper drum at a point between the upper and lower portions with the lower portion of the boiler, substantially as set forth.

3. In a water-purifier for boilers, the combination of complementary drums or chambers arranged the one above the other and in communication, a blow-off applied to the bottom portion of the lower drum, a valved pipe connecting the top portion of the upper drum with the steam-dome of the boiler, and valved pipes connecting the drum with, respectively, the upper and lower portions of the boiler, the inflow-pipes of the respective drums connecting with the boiler at points corresponding with the high and low water marks, respectively, substantially as specified.

4. In combination with a boiler, a purifier comprising upper and lower drums in communication, a blow-off applied to the lower drum, a valved pipe connecting the upper drum with the steam-space of the boiler, valved pipes connecting the upper portion of the respective drums with the boiler at points corresponding, respectively, with the high and low water marks, other valved pipes connecting the upper drum with the lower portion of the boiler, one of the latter pipes connecting with the upper portion and the other pipe with the intermediate portion of said upper drum, and a vessel fitted to the upper drum for containing an agent to be added to the water in circulation, substantially as set forth.

In testimony whereof I affix my signature in presence of two witnesses.

DANIEL N. BAXTER. [L. S.]

Witnesses:
WILLIAM G. HOUSER,
KATHERINE BELL.